United States Patent
Gold

(10) Patent No.: US 9,787,756 B2
(45) Date of Patent: *Oct. 10, 2017

(54) PROXIMITY-ENABLED REMOTE CONTROL

(71) Applicant: Steven K. Gold, Lexington, MA (US)

(72) Inventor: Steven K. Gold, Lexington, MA (US)

(*) Notice: Subject to any disclaimer, the term of this patent is extended or adjusted under 35 U.S.C. 154(b) by 193 days.

This patent is subject to a terminal disclaimer.

(21) Appl. No.: 14/738,233

(22) Filed: Jun. 12, 2015

(65) Prior Publication Data

US 2015/0281323 A1    Oct. 1, 2015

Related U.S. Application Data

(63) Continuation of application No. 14/504,852, filed on Oct. 2, 2014, now Pat. No. 9,060,011, which is a continuation of application No. 14/180,732, filed on Feb. 14, 2014, now Pat. No. 8,855,622, which is a continuation of application No. 13/346,601, filed on Jan. 9, 2012, now Pat. No. 8,655,345.

(60) Provisional application No. 61/430,971, filed on Jan. 8, 2011.

(51) Int. Cl.
| | |
|---|---|
| *H04L 29/08* | (2006.01) |
| *G06F 3/0481* | (2013.01) |
| *H04M 1/725* | (2006.01) |
| *H04W 4/00* | (2009.01) |

(52) U.S. Cl.
CPC .......... *H04L 67/025* (2013.01); *G06F 3/0481* (2013.01); *H04L 67/125* (2013.01); *H04M 1/7253* (2013.01); *H04M 1/72533* (2013.01); *H04W 4/008* (2013.01); *H04M 2250/04* (2013.01)

(58) Field of Classification Search
CPC ............ H04M 1/7253; H04M 1/72533; H04L 67/125; H04W 4/008
See application file for complete search history.

(56) References Cited

U.S. PATENT DOCUMENTS

| | | | | |
|---|---|---|---|---|
| 7,564,369 B1 * | 7/2009 | Adams | .................... | G08C 23/04 |
| | | | | 340/12.53 |
| 8,655,345 B2 * | 2/2014 | Gold | .................... | H04M 1/7253 |
| | | | | 345/173 |
| 8,855,622 B2 * | 10/2014 | Gold | .................... | H04M 1/7253 |
| | | | | 345/173 |
| 9,060,011 B2 * | 6/2015 | Gold | .................... | H04M 1/7253 |
| 2002/0077114 A1 * | 6/2002 | Isham | .................... | H04L 67/36 |
| | | | | 455/454 |

(Continued)

*Primary Examiner* — Kashif Siddiqui
(74) *Attorney, Agent, or Firm* — Blueshift IP, LLC; Robert Plotkin

(57) ABSTRACT

The invention relates to systems and methods that enable a mobile device to be approximated with an object in order to enable control of the object. In one possible embodiment of a method of the invention, a mobile device is brought in physical proximity with an object, the identity of the object is determined wirelessly, based on such determination, a remote control user interface is presented by the mobile device, the mobile device receives input relating to a desired control action for the object, and the mobile device wirelessly communicates with a remote computer to facilitate control of the object. Various embodiments of the invention are possible to address a wide range of practical applications.

36 Claims, 8 Drawing Sheets

(56) References Cited

U.S. PATENT DOCUMENTS

| | | | |
|---|---|---|---|
| 2003/0141987 A1* | 7/2003 | Hayes | G08C 19/28 340/12.25 |
| 2008/0318564 A1* | 12/2008 | Kreiner | G08C 17/02 455/420 |
| 2011/0105097 A1* | 5/2011 | Tadayon | H04W 4/025 455/418 |
| 2012/0146918 A1* | 6/2012 | Kreiner | H04M 1/7253 345/173 |
| 2012/0246717 A1* | 9/2012 | Burton | G06F 21/78 726/21 |

* cited by examiner

PROXIMITY-ENABLED REMOTE CONTROL

BACKGROUND

Mobile devices—meaning portable electronic devices that are capable of wireless communication (e.g., cell phones, smart phones)—are widely used for a variety of digital and voice communication, and other purposes. Today's mobile devices enable, among other things, email, text messaging, instant messaging, Internet browsing and (still) phone conversation. In addition, mobile devices may be used to remotely control objects. For example, mobile devices may run applications that allow these devices to wirelessly control a home entertainment or lighting system. Such remote control may, for example, be by means of direct wireless control of an object (e.g., Bluetooth), meaning direct electromagnetic communication between the mobile device and the controlled object (such as is the case with today's television remote controls). This may occur by means of any of a variety of wireless protocols.

Some of the challenges faced by today's remote controls, including those implemented on mobile devices, relate to 1) the difficulties posed to a user to synchronize or otherwise set up a remote control so that it will communicate with a particular object that the user desires to control, 2) the need for a user to have multiple different remote controls for multiple different objects that a user desires to control, 3) difficulties updating remote control user interfaces, if even possible, and 4) a general lack of real-time feedback to the user relating to the object being remotely controlled.

There exists a need for improved methods, devices and systems that allow a user to use a mobile device, such as a common smart phone or similar electronic communication device, to readily "synchronize" the mobile device with one or more remotely controllable objects, and to enable the presentation and use of one or more relevant remote control user interfaces so that a user can efficiently and effectively remotely control one or more remotely controllable objects, possibly including real-time feedback.

BRIEF SUMMARY OF THE PRESENT INVENTION

The present invention, in one embodiment, relates to a near-field communication (NFC) enabled mobile device that is able to communicate with one or more NFC element-associated remotely controllable objects, to cause the presentation of one or more object-relevant remote control user interfaces on a mobile device, the object-relevant remote control user interface which is then capable of receiving inputs from a user of the mobile device (the inputs relating to the user's desire to cause some action at the remotely controllable object, such as a remotely controllable television, for example), and to then wirelessly communicate information by means of a remote computer that electronically facilitates the desired action at the target remotely controllable object. The following definitions are general, not limiting, and detailed below: a "NFC enabled mobile device" is a mobile device (e.g., smart phone) equipped with a NFC reader (e.g., RFID tag reader) capable of wirelessly receiving a transmitted signal from a tag; this tag (or similar structure or object) is a "NEC element" which may be a passive or active transmitter that is associated (e.g., combined) with a remotely controllable object to provide a "NEC element-associated remotely controllable object"; a "user interface" is a presentation on a mobile device that invites and accepts user input; such a user interface is an "object-relevant remote control user interface" when it is directed to the remote control of a specific object or type of objects; and a "remote computer" is any electronic processing device physically separate from the mobile device.

The present invention includes many embodiments, such as variations in the ways that a remotely controllable object may be detected or identified, variations in possible remote control user interfaces and how they are communicated to a device and presented to a user of the device, variations in the protocols used by elements of the invention to communication with one another, and more. In addition, embodiments of the present invention may enable feedback from the remotely controllable object to the mobile device, either by means of a remote control user interface, or otherwise, such as tactile feedback or audio signals. Many other variations of the invention are possible.

One example of an embodiment of a system of the present invention involves a mobile device, such as a smart phone (e.g., an Apple iPhone), having a mobile device-associated NFC element, the smart phone (when brought into physical proximity with an object-associated NFC element, e.g., within five centimeters, such that the mobile device-associated NFC element is capable of reading/receiving a signal from the object-associated NFC element) that identifies a remotely controllable object and then enables a specific remote control user interface for the remotely controllable object, the remote control user interface then being able to receive input from a user of the mobile device (e.g., an indication of a desired action at the remotely controllable object) using the remote control user interface presented on the smart phone, and the smart phone which then communicates (e.g., over the Internet or other network) information relating to the desired action to a remote computer (such as one that is in the "cloud" and remotely located from the object) to ultimately cause the desired action at the object. In this example, subsequent inputs may be input to the smart phone by the user to cause further responses at the remotely controllable object; the remote control user interface may be updated periodically, based on either user actions or sensed inputs at the remotely controllable object, the user may receive information by means of the smart phone relating to the status of the remotely controllable object, and more.

Another example representative of a method of the present invention includes the steps of: 1) a mobile device (being NFC equipped) being brought into physical proximity (e.g., within ten centimeters) with a NFC element that is associated with a remotely controllable object, 2) based on and in response to such approximation of the mobile device and the remotely controllable object, the mobile device then presenting a relevant remote control user interface that is capable of receiving input from a user relating to a desired action (by the user) at the object, 3) the mobile device remote control user interface receiving input from the user relating to a desired action, 4) the mobile device wirelessly communicating information relating to the desired action with a remote computer, 5) the remote computer communicating information relating to the desired action to an object controller associated with the object, and 6) the object controller facilitating the desired action at the object. Subsequent steps may relate to feedback of information sensed at the remotely controllable object, updates to the remote control user interface, and more. Additional steps, and variations on these steps, are also possible. For example, an authentication step (or multiple authentication steps) may occur at points in the process, such as only presenting a remote control user interface to certain users, or to certain (or all) users positioned within a defined geographic area (or space), or performing certain tasks (or exhibiting certain behaviors, such as may be sensed my sensors associated with a mobile device); or limiting inputs at the mobile device, or actions at the remotely controllable object, to certain users (or user groups) based on user identification, user authentication (by means such as a password, identity, behavior, or biometric scan), user behavior, or any of a variety of other information, inputs or metrics.

The preceding two embodiments are simply examples of embodiments of the present invention, and the invention can be embodied and implemented in any of a variety of ways. Examples of variations include different types of system elements (e.g., smart phone, dedicated remote control, portable control system) and related methods, different presentations of a remote control user interface, different communication means and protocols, different means of facilitating control of an object, and more. Systems and methods of the present invention may be implemented in any of a variety of ways. For example, systems and methods of the present invention may be implemented using a bar code and optical reader interaction, instead of near-field communication transmission and reception, respectively. It should be noted that the term "near-field communication" (also referred to as "NEC") is simply one possible means of having a mobile device interact with an object to learn the identity of the object and/or which remote control user interface (or other element of the invention) to use. NFC, RFID, bar code, QR code and related "object identification" technologies are evolving rapidly along with how we refer to them, and each of these enables the passive non-contact identification of an object in a manner that is consistent with the present invention.

BRIEF DRAWING DESCRIPTIONS

DETAILED DESCRIPTION OF THE PRESENT INVENTION

Figure 1A:
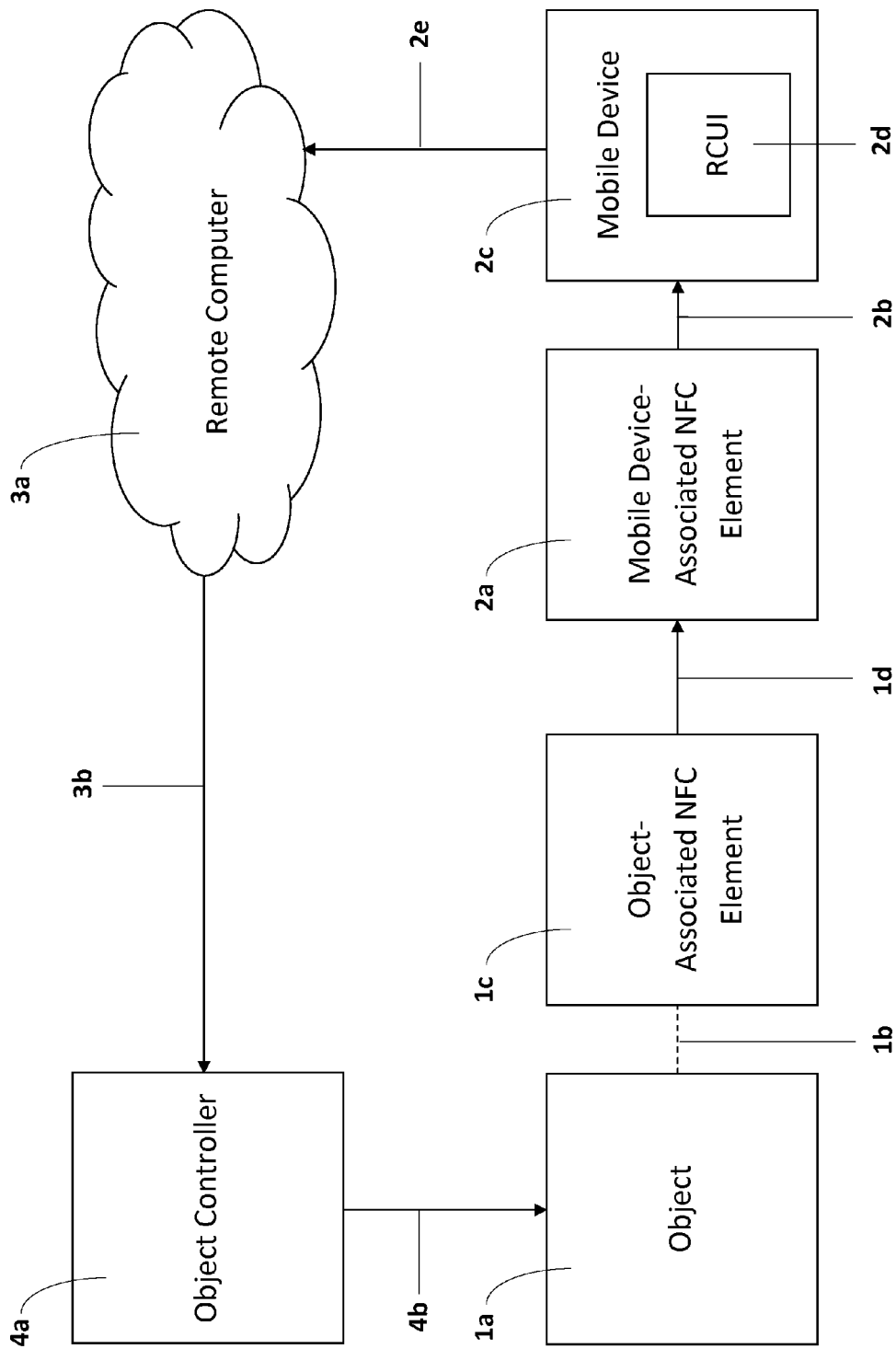
FIG. 1A shows a representation of an embodiment of a first system of the present invention.

The present invention relates to systems and methods for proximity-based remote controls (also, without limitation, referred to as proximity-based identification communication) that may be used, for example, to facilitate the identification of a remotely controllable object and enable a remote control user interface (RCUI) to be presented by a mobile device that then allows a user of the mobile device to remotely control the identified object by means of the remote control user interface. Such a RCUI may be presented by a mobile device on an electronic display as soft keys, for example, and such soft keys may be arranged or otherwise presented in a way that is relevant to (or even reconfigurable by) the system or a user, possibly based on user identification, authentication, preferences, user location, past behavior, or other information. The ability for a user to tag (e.g., approximate a mobile device to) an object to thereby remotely control the object may be implemented in any of a variety of ways. For example, embodiments of the present invention may enable upload of a RCUI (or the information needed to create a RCUI on a mobile device) to a mobile device, based on identification of an object desired to be controlled, from any of a variety of sources (e.g., a source associated with the object, a server that is in communication with the mobile device using a network such as the Internet). A RCUI may take any of a variety of forms, including but not limited to soft keys that are presented by an electronic display of a mobile device. Furthermore, embodiments of the present invention may use any of a variety of means to communicate remote control user interface inputs to an object controller. In one embodiments, such communication may take place wirelessly over a network, such as the Internet, and may include communication between a mobile device and a remote computer, and a remote computer and an object controller (that controls a controllable feature of the object), for example.

In one embodiment of the present invention, a proximity-based communication technology is near-field communication (NFC) technology, whereby a NFC reader-equipped mobile device communicates with a NFC element that is associated with a remotely controllable object. By "associated with," it is meant that a NFC element is either attached to, or located physically near, an object. For example, a NFC element may be built into the structure of a remotely controllable object, such as a toy. As another example, a NFC element may be located near a remotely controllable object, such as being placed on a wall of a room for which the lighting system is capable of being remotely controlled (in this example, it would be impractical to attach or access a NFC element onto a lighting element located in the ceiling). In such embodiments, this enables an object-relevant remote control user interface to be presented by the mobile device, in order to allow a user to control the remotely controllable object by means of the relevant remote control user interface enabled at the mobile device. Such an object relevant remote control user interface is also referred to herein as a "remote control user interface," "user interface," or "RCUI." An example of such a remote control user interface may be a presentation of soft keys (e.g., virtual buttons or other controls) on an electronic display on a mobile device. Such soft keys may be as simple as "on" and "off" buttons, or they may be much more complex control elements, such as visual representations of sliders, knobs switches and more. Another embodiment includes proximity-based identification technology that is an optical image reader (e.g., mobile device camera, bar code reader) that is capable of reading a bar code or other visual identification marking printed onto, or otherwise associated with, an object, to thereby enable a relevant remote control user interface in accordance with the invention. Other embodiments involving radio, visual, sound, movement and location (e.g., the enablement of remote control user interface based on a location of a mobile device) proximity-based communication means are also possible. In one embodiment of the present invention, a mobile device enables control of an object by means of wirelessly communicating information (e.g., over the Internet or other network) to a remote computer (e.g., a server or other computer located in the "cloud" and physically separate from an object), to cause the remote computer to further communicate information to an object controller that is capable of performing an action at or by the object.

For clarity, the term "proximity" means physically close, and more specifically that two structures (such as a mobile device and a NFC element) are either within a meter of each other, within ten centimeters of each other, within five centimeters of each other, within three centimeters of each other, within two centimeters of each other, within one centimeter of each other, or within any similar distance that enables accurate reading of a NFC or radio frequency identification (RFID) signal. For other identification means, such as the reading of a bar code or QR code, distances may be lesser or greater, such as within tens of meters, within one meter, within 10 centimeters, or possibly within much greater distances. In general, as NFC, RFID and other technologies evolve, the ability for transmitters to transmit signals over greater distances, and readers to receive signals over greater distances, will occur, and so "proximity" as it relates to the present invention may vary. In certain embodiments, proximity will be "in the line of sight" or a distance at which a user may readily access a particular remotely controllable object.

FIG. 1A shows a representation of a first embodiment of a system of the present invention. In this particular embodiment, an object 1a is associated with an object-associated NFC element 1c (the association represented as 1b), communication occurs between object-associated NFC element 1c and mobile device-associated NFC element 2a (the communication represented as 1d), mobile device-associated NFC element 2a communicates with mobile device 2c (the connection represented as 2b) in order to enable a remote control user interface ("RCUI") 2d, wireless communication occurs between mobile device 2c and a remote computer 3a (such wireless communication represented by 2e), the remote computer 3a then communicates with an object controller 4a (the communication represented as 3b) to ultimately control object 1a (such interaction represented as 4b). In another embodiment similar to the one represented in FIG. 1A, object-associated NFC element could instead be a bar code or other identifying mark or characteristic at or near the object, mobile device-associated NFC element could instead be an optical reader (such as a mobile device camera that serves as a bar code reader or scanner), and the communication between them could instead be a reading by the mobile device of the optical bar code or visual identifier. While such an optical implementation (versus the use of NFC) may be less convenient to use since a user of a mobile device would need to scan a bar code or other visual identifier, rather than quickly tag an object using NFC technology, the use of a printed bar code or other optically-readable identifier or characteristic at an object is less expensive to implement in many cases. For example, bar codes may be practical on printed documents, books, envelopes, packaging, garments, signs, etc. Other embodiments of systems of the present invention, including but not limited to object identification processes and means, are within the scope of the present invention.

Figure 1B:
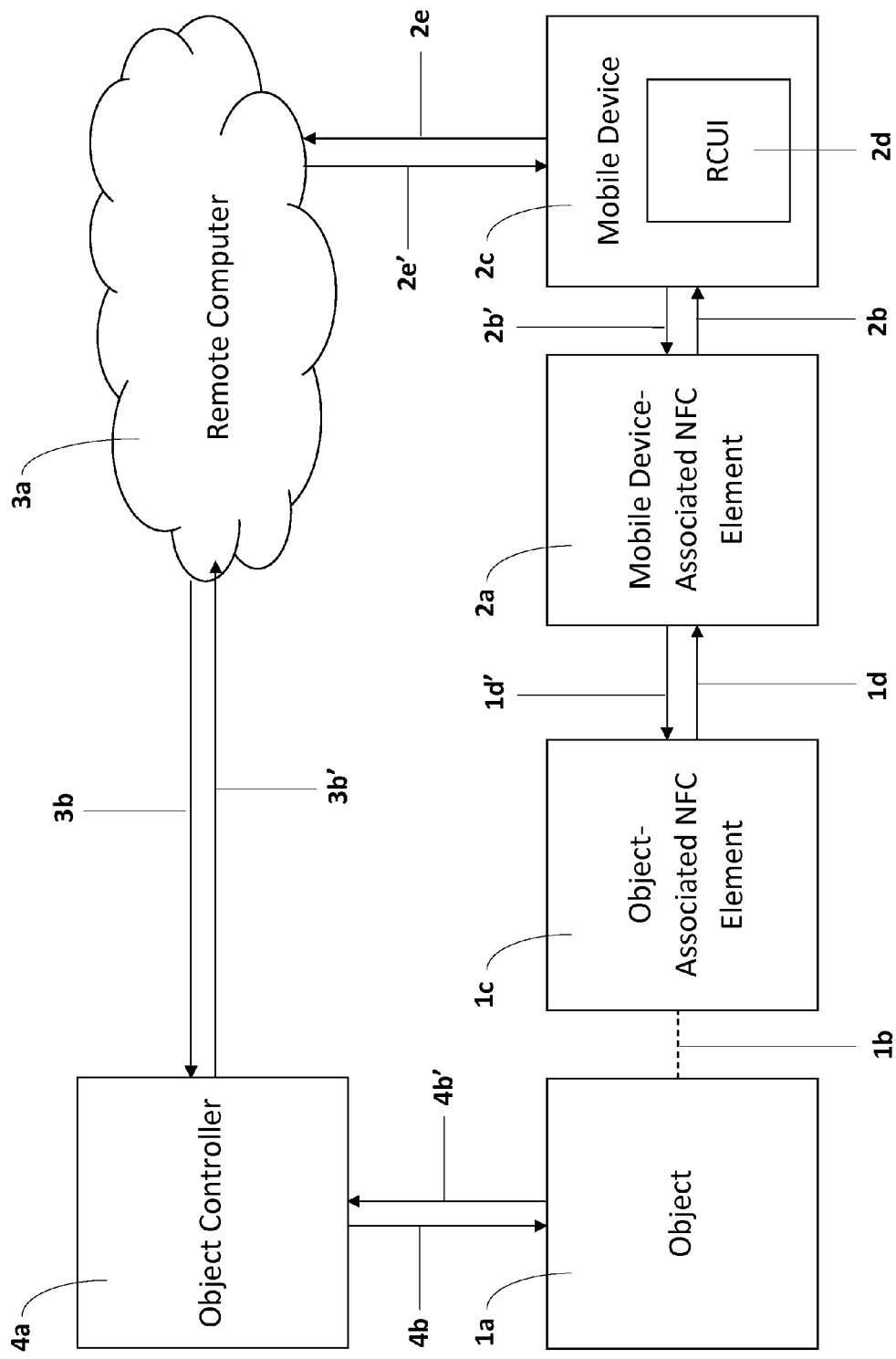
FIG. 1B shows a representation of a second embodiment of a system of the present invention.

FIG. 1B shows a second representation of an embodiment of a system of the present invention, having additional elements relative to the embodiment shown in FIG. 1A. Such additional elements are directed to providing "feedback" in a direction from generally the object to the mobile device (e.g., rather than providing control inputs at a mobile device to facilitate control of an object, these additional elements are, in one embodiment, intended to enable feedback from an object back to a mobile device, in order, for example, to provide a user with feedback and/or to facilitate control of the object). As shown in FIG. 1B, these additional elements may include: communication between mobile device-associated NFC element 2a and object-associated NFC element 1c (such communication represented as additional element 1d'), connection between mobile device 2c and mobile device-associated NFC element 2a (such connection represented as additional element 2b'), wireless communication between remote computer 3a and mobile device 2c (such communication represented as additional element 2e'), communication between remote computer 3a and object controller 4a (such communication represented as additional element 3b'), and interaction between object controller 4a and object 1a (such interaction represented as additional element 4b'). FIG. 1B shows these additional elements (relative to FIG. 1A), each of such additional elements which may be used in an embodiment of the present invention, or combined with other such additional elements (shown in FIG. 1A) to create other embodiments of the present invention. For example, one embodiment includes wireless communication 2e' and communication 3b', and not include communication 1d', connection 2b' and interaction 4d'. Also, for example, another embodiment of the present invention includes wireless communication 2e' and not communication 1d', connection 2b' communication 3b' and interaction 4b'. For purposes of this disclosure, the terms "communication," "connection," and "interaction" are used interchangeably and generally to mean a transfer of information between a first element and a second element in accordance with embodiments of the present invention. Other embodiments and variations of these embodiments of systems are within the scope of the present invention.

Object 1a may be any remotely controllable object, meaning that object 1a may be the subject of an action (or actions). Such action may be a form of control of object 1a, for example, such as turning it on or off, or altering its direction. Such action may also possibly be electronic in nature (and/or not readily apparent to a user of object 1a), such as changing a set-point stored in an object-associated data set, or configuring or reconfiguring software associated with the object. Embodiments of the present invention may include other types of "action." Representative object 1a include, but are not limited to: electronic devices, mechanical devices, electromechanical devices, televisions, cable set-top boxes, media players, toys, entertainment systems, vehicles, aircraft, computers, mobile devices, office equipment, lighting, climate control systems, documents, security systems, doors or passages, manufacturing equipment, exercise equipment, medical devices, living organisms (e.g., by means of an electromechanical or medical device interface), and more. Representative actions that one or more objects may be subject to include, but are not limited to: being turned on, being turned off, being opened, being closed, getting directed or redirected (e.g., left, right, up, down), entering settings, changing settings, enabling access, denying access, having data transferred to object electronic memory, having a data element reset in object electronic memory, uploading or downloading software or executable code to the object (e.g., over the Internet or other network using the Internet Protocol (IP)) or other network, such as a Local Area Network (LAN), causing software or executable code to be run by an electronic processor that is associated with the object, changing channels, changing volume, causing an action to return to a default setting or mode, and more.

Actions that are performed at an object include, for example, actions that are mechanical, electrical, electromechanical, and/or biological. Other variations in objects and ways to control such objects fall within the scope of the present invention.

Object-associated NFC element $1c$ is any means that enables "near-field" contactless communication with a mobile device-associated NFC element of the present invention. NFC technology aimed at use with mobile devices may generally perform one or more of the following functions, without limitation: 1) card emulation to cause a NFC element to behave like a contactless card; 2) reader mode wherein a NFC element may receive signals from a RFID tag or other passive or active transmitter; and 3) peer-to-peer (P2P) mode when a first NFC element associated with an object is able to communicate with a second NFC element associated with a mobile device, and more. A particular NFC technology (e.g., a NFC "chip" or RFID "tag") may transmit information, possibly receive information, or both (e.g., exchange information). Today's NFC technologies—meaning NFC technologies typically used at the time of this disclosure—are generally very short-range high-frequency (e.g., 13.56 MHz) wireless communication technologies that enable the communication of information or data between NFC-enabled devices over a distance of typically less than twenty centimeters, often less than ten centimeters, and often less than five centimeters. Such NFC technology may be currently (and in general) an extension of the ISO/IEC 14443 proximity card (RFID) standard that combines the interface of a smartcard and a reader into a single unit. A NFC-enabled device may be capable of communicating with existing ISO/IEC 1443 smartcards and readers, and also with other NFC-enabled devices. In general, this makes today's NFC technologies compatible with existing contactless communication infrastructure, such as contactless access and payment systems used in public transportation and retail environments, respectively. For purposes of this disclosure, "close physical proximity" may, as discussed earlier, mean distances of up to a meter, or up to ten centimeters, or up to five centimeters, or other distances; and possibly distances of more than a meter such as may be enabled by an active transmitter or more sensitive receiver. NFC element operating ranges depend on the type of NFC technology being used, specific models, and the way in which a particular NFC technology is implemented. For example, many passive RFID tags and readers require proximity of less than a few centimeters to operate under most operating conditions, whereas active (or semi-active) RFID tags may have a much greater functional range. Conditions that are external to a specific NFC technology or product may influence operating ranges and other functional characteristics. Antenna type and implementation, as well as the object or device with which a particular NFC technology is associated, may also affect the technology's performance characteristics. Today's NFC technology is being actively incorporated into a variety of mobile devices, such as smart phones, and it is expected that virtually all mobile communication devices will be NFC equipped (at least with readers capable of receiving signals being transmitted from a NFC element or RFID tag) in the future. In addition to NFC technology as it is known and recognized today, the present invention anticipates that NFC technology, along with related standards and communications protocols, will evolve. The use of the terms "near-field communication" and "NEC" (and "RFID") herein are meant only to represent such technologies in a general way. It is anticipated that future NFC technologies and implementations will enhance the value of embodiments of the present invention, and such future NFC technologies are anticipated in the present references relating to near-field communication, NFC and RFID. Variations in NFC elements and technologies of the present invention fall within the scope of the present invention.

Figure 1C:
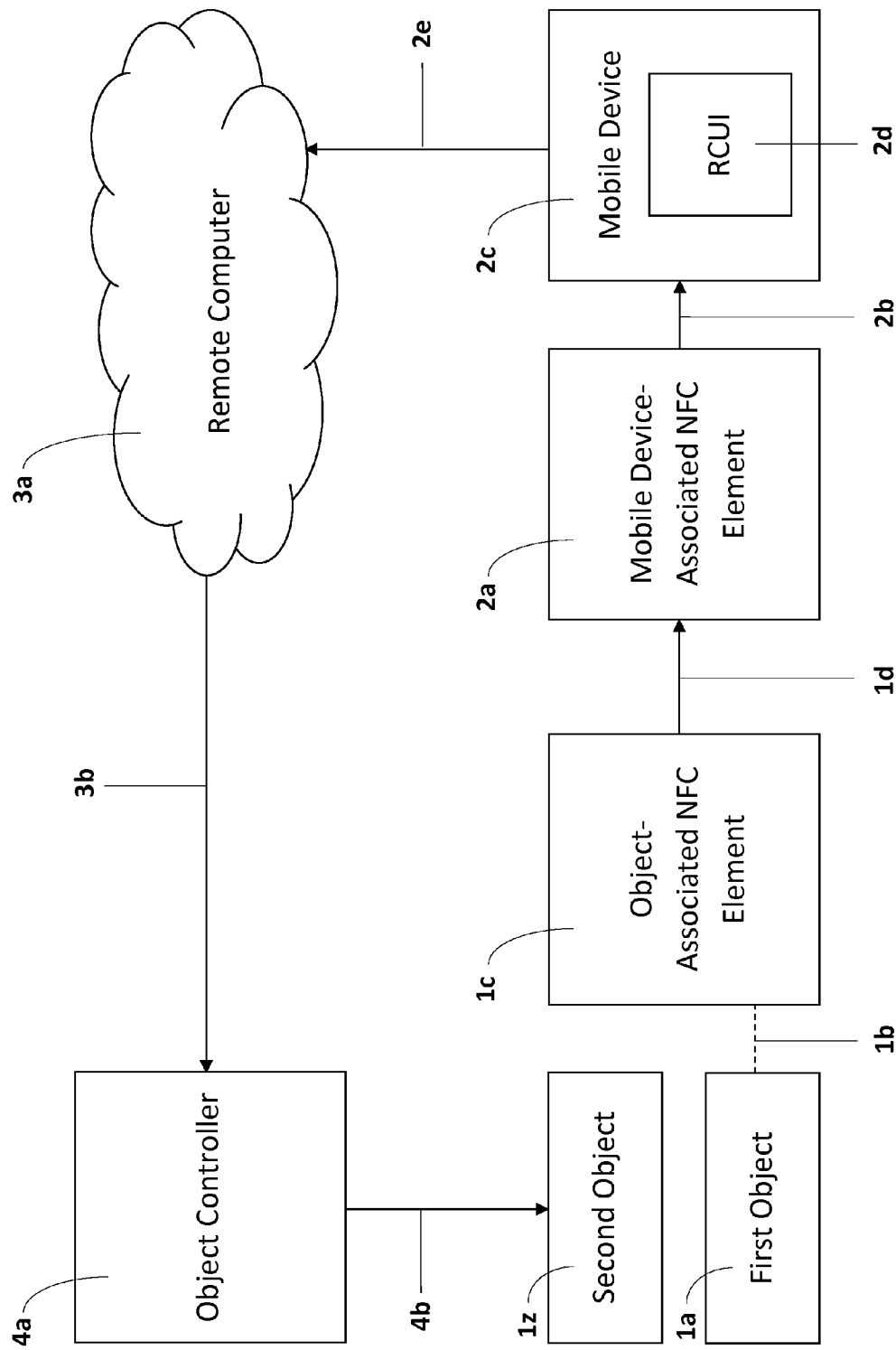
FIG. 1C shows a representation of a third embodiment of a system of the present invention.

Association $1b$ between object $1a$ and object-associated NFC element $1c$ may take any of a variety of forms. For example, in one embodiment of association $1b$, object-associated NFC element $1c$ may be incorporated into or onto the physical structure of object $1a$ (e.g., embedded in a television, positioned on the surface of a set-top box). In another embodiment of association $1b$, object-associated NFC element $1c$ may be physically separate from object $1a$. In one such example, object-associated NFC element $1c$ may be located on or in a physical (e.g., paper) user manual relating to object $1a$. In another example, object-associated NFC element $1c$ may be located on, at, or within a building or other structure, and may enable control of an object associated with the building or other structure, such as a lighting or entertainment system in a room of the building. In yet other examples consistent with the present invention, object-associated NFC element $1c$ may be located or positioned at a related object that is physically distant from the object to be controlled, but nevertheless associated with the object to be controlled. As an example, one such embodiment involves using a mobile device to tag a first object that is similar to a second object $1z$ (e.g., first and second objects are of the same type or category, first and second objects have one or more similar controllable elements), and being able to remotely control the second object $1z$ using the mobile device and user interface. FIG. 1C shows a representation of an embodiment relating to the concept of tagging a first object $1a$ and then being able to use a relevant RCUI to control a similar second object $1z$. Various other associations $1b$ between object $1a$ and object-associated NFC element $1c$ are within the scope of the present invention. In general, however, a feature of any such association $1b$ is that a user may realize or be informed (e.g., by written notice or an image or logo that represents, for example, a network of objects or elements) that a particular object-associated NFC element $1c$ is associated with object $1a$.

Mobile device-associated NFC element $2a$ may be a NFC element as described previously. Mobile device-associated NFC element $2a$ may be the same type as, or different from, object-associated NFC element $1c$. For example, mobile device-associated NFC element $2a$ may be a fully-functional means that may serve to both wirelessly transmit and receive information, whereas object-associated NFC element $1c$ may simply be capable of transmitting a signal (e.g., a passive RFID tag). Mobile device-associated NFC element may be integrated with a mobile device, or may be connected or otherwise attached to a mobile device of the present invention using any of a variety of means. Mobile device-associated NFC element may be embodied in any of a variety of ways.

Mobile device-associated NFC element $2a$ and object-associated NFC element $1c$ are capable of communicating with one another, such as when they are brought into physical proximity with one another (this process may be referred to as "tagging" an object, and an object may be "tagged" by a NFC-equipped mobile device), either unidirectionally (meaning information is transmitted by an object-associated NFC element and received by a mobile device-associated NFC element) or bidirectionally (meaning both NFC elements have the ability to transmit information to, and receive information from, each other). In general, NFC communication between these elements occurs wirelessly (even when the structures associated with each NFC element touch one another). In one embodiment of the present invention, communication may be one-way transmission of information from object-associated NFC element 1c to mobile device-associated NFC element 2a, as represented by 1d in FIG. 1A (this may occur even when object-associated NFC element 1c is capable of two-way communication). In another embodiment of the present invention, communication may be two-way, meaning that both of the elements transmit and receive information from one another, as represented by 1d and 1d' in FIG. 1B. The preference or need for one-way or two-way communication between object-associated NFC element and mobile device-associated NFC element will depend on a variety of factors, including but not limited to the particular application(s) for an embodiment of a system of the present invention. In some embodiments, only identification of object 1a by mobile device 2c may be desired, in which case one-way flow of information from object-associated NFC element 1c to mobile device-associated NFC element 2a is required. References to "physical proximity" in this disclosure are intended to mean that NFC elements of the present invention are positioned close enough together that they are capable of communicating with one another. Variations in the communication between object-associated NFC element 1c and mobile device-associated NFC element 2a are within the scope of the present invention. In addition, the information communicated between an object-associated NFC element and a mobile device-associated NFC element may include, without limitation, information relating to the identity of the object. Furthermore, such information may relate to a remote control user interface, such as providing an upload of a particular RCUI to a mobile device (or alternatively providing information needed for the device to create a RCUI, e.g., based on accessing a library of remote control user interface elements that may be stored either by the device or by a remote computer, for example). Other types of information may also be communicated, possibly including information being sent from a mobile device to storage by electronic memory associated with the object-associated NFC element. In addition, any of a variety of communication protocols may be used to facilitate such communication between an object-associated NFC element and a mobile device-associated NFC element.

Mobile device 2c may be any of a variety of portable electronic devices (and that are equipped with, enabled, or associated with mobile device-associated NFC element 2a). In one embodiment, mobile device 2c is a smart phone (e.g., Apple iPhone, Android phone, Blackberry device). In other possible embodiments, mobile device 2c may be another device or technology fitting the functional description of a mobile device of the present invention (e.g., capable of presenting information to a user, receiving an input from a user, and being capable of communicating wirelessly with a remote computer). In one embodiment of the present invention, mobile device 2c includes a display capable of visually presenting information to a user. Other embodiments may include other means of presentation of information to a user, such as presenting information to the user via audio output (e.g., providing prerecorded and/or synthesized sounds, such as providing prerecorded and/or synthesized speech). Embodiments of mobile device 2c of the present invention may also provide tactile output, such as having the device vibrate. In addition, embodiments of mobile device 2c of the present invention include means for receiving an input (or multiple inputs, or simultaneous inputs) from a user of the device. Examples of means for receiving an input include, but are not limited to: soft keys, touch screen (e.g., interactive touch display), hard keys, switches, knobs, microphones, and user manipulation (e.g., tilting, turning, shaking) of the device. Variations in mobile devices, display means and input means of the present invention are within the scope of the present invention.

Figure 2C:
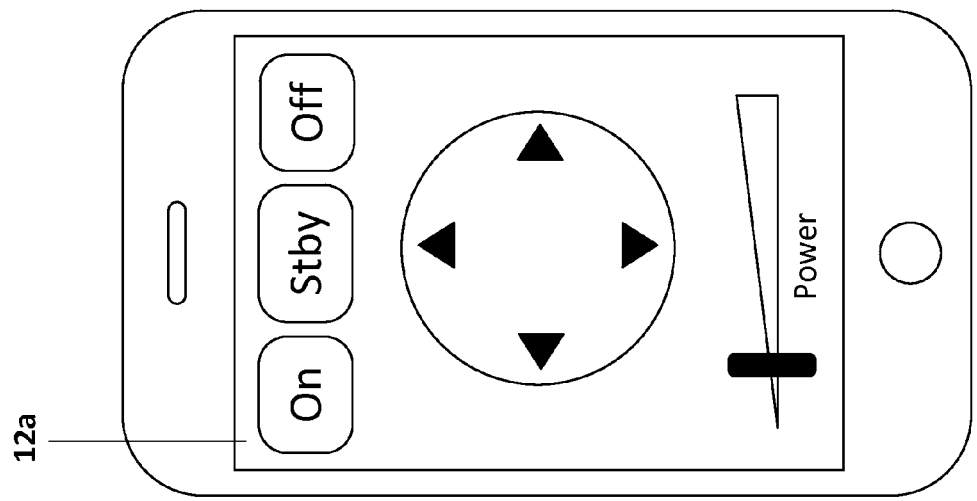
FIG. 2C shows a representation of a third embodiment of a remote control user interface.
Figure 2B:
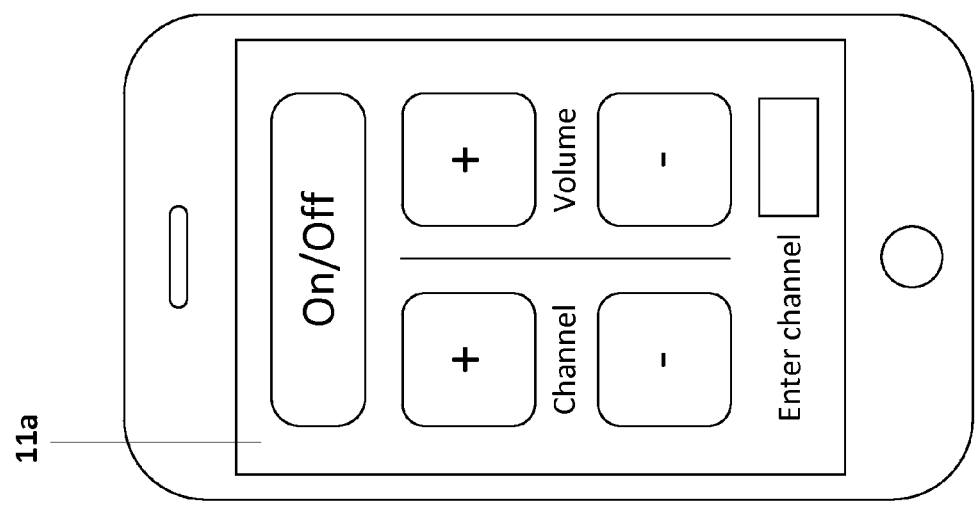
FIG. 2B shows a representation of a second embodiment of a remote control user interface.
Figure 2A:
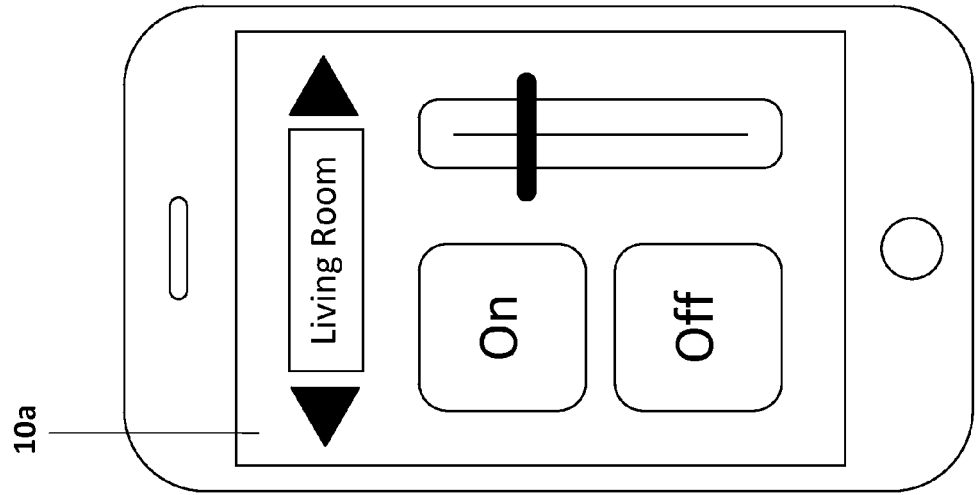
FIG. 2A shows a representation of a first embodiment of a remote control user interface.

Remote control user interface 2d is, in one embodiment, a presentation at mobile device 2c that communicates a remote control, such as one or more soft controls that may be interacted with by a user. Remote control user interface 2d enables interaction by a user to facilitate control of an object 1a. In one embodiment, remote control user interface 2d may automatically appear on a display of a mobile device, for example, and be readily available for use by a user. In another possible embodiment, remote control user interface 2d may be uploaded to a mobile device and stored for presentation and use at a future time. Control of an object 1a may be facilitated by remote control user interface 2d in any of a variety of ways, and using any of a wide range of embodiments. For example, remote control user interface 2d may be a visual presentation on an interactive (e.g., touch screen) display, such as the representative embodiments of remote control user interface shown in FIGS. 2A-2C, each of which shows a simplified representation of a mobile device 2c having a touch screen (e.g., display that can be used to both present information to a user of the device, and receive input from the user of the device, such as by means of touching the display surface with a finger) upon which representations of various embodiments of remote control user interface 2d are shown. In other embodiments, remote control user interface 2d may present information in other ways, and/or receive input from a user in other ways. For example, in one embodiment, remote control user interface 2d may be presented on another type of visual display, such as a non-interactive (e.g., non-touch screen) display. In another embodiment, remote control user interface may be presented as hard keys or controls, possibly involving an indication of which hard keys or controls may be used to control a particular target object. Embodiments may also involve non-visual presentations of a remote control user interface. In one such embodiment, sounds may be used to represent the possibility for a user to interact with such a remote control user interface to provide input or a command. In another embodiment, a synthetic voice may notify a user relating to control of a target object, or even guide a user through the input or selection of permissible commands to control a target object. Other means and modes of presenting a remote control user interface to a user are within the scope of the present invention. In addition, other means of interaction with a remote control user interface of the present invention may be used by embodiments of the present invention. In one embodiment, an interactive touch-screen display is used, such as shown in FIGS. 2A-2C. In another embodiment, hard keys located on a mobile device may be used to input information to a remote control user interface of the present invention. In other embodiments, sounds and/or voice commands may be used to provide input to a remote control user interface of the present invention. In yet another embodiment of a remote control user interface of the present invention, movement of the mobile device upon which the remote control user interface is operating may provide input to facilitate control of a target object (e.g., moving or rotating the mobile device to the left to cause a remotely controlled moving object to turn left; moving or tiling the mobile device to the right to cause the same remotely controlled moving object to turn right). Various combinations of one or more remote control user interface presentations and input means are within the scope of the present invention. In addition, embodiments that use other forms of input and output are within the scope of the present invention.

In one embodiment of the present invention, remote control user interface 2d is determined by virtue of object 1a identification, and then enabled on mobile device 2c. Remote control user interface may be selected from a group of predetermined remote control user interfaces, e.g., from a library of RCUIs stored in memory. Such a library of RCUIs may, for example, be stored in memory associated with mobile device 2c, or in memory associated with remote computer 3a (and made accessible to mobile device 2c, for example). Alternatively, embodiments of the present invention may provide for dynamic creation of a RCUI from a library of pre-defined remote control user interface elements. Such a library of RCUI elements may, for example, exist in memory associated with a mobile device 2c, remote computer 3a, or NFC element 1c. In the case when RCUI (or RCUI element) information or data is stored separately from mobile device 2c, such information or data (as needed to facilitate creation or presentation of a RCUI on mobile device 2c) is communicated from where the data is stored to mobile device 2c, using any of a variety of means, including those described herein. For example, a user may place a mobile device 2c near an object-associated NFC element 1c for object 1a to cause mobile device 2c (possibly in communication with remote computer 3a) to identify a relevant remote control user interface 2d for the particular object 1a. In the case where object 1a is a television, for example, the enabled remote control user interface 2d may resemble the representative remote control user interface 2d shown in FIG. 2B (including on/off, volume and channel selection controls). In one embodiment of the present invention, remote control user interface 2d is provided from a set of predesigned remote control user interfaces, subject to identification of an object and determination of which one of the set of predesigned remote control user interface is most relevant to a user relative to the remote control of the particular object. In another embodiment of the present invention, a remote control user interface may be dynamically created based on a set (e.g., a library) of predefined remote control user interface elements (e.g., volume control, channel control, direction control), and provided to a user, possibly based on the known preferences of the particular user (e.g., which remote control user interface elements should be included and/or positioned in a particular way, color scheme), or other information relating to a user, object or circumstances. In yet another embodiment of the present invention, a remote control user interface may be communicated by means of a transfer of executable code or otherwise (e.g., using identifiers that enable selection and configuration of remote control user interface elements) from an object-associated NFC element to a mobile device so that the particular remote control user interface may be enabled on the mobile device. In yet another embodiment of the present invention, the object-associated NFC element communicates information that enables a mobile device to further communicate with a remote computer in order to transfer information (possibly including instructions, software or executable code, or a combination of these) from the remote computer to the mobile device. In yet other embodiments of the present invention, the remote control user interface may be provided to the mobile device, or enabled at the mobile device (e.g., presentation to a user, or access enabled for a user) based on a device location, such as may be determined by a device-associated global positioning system (GPS) or Wifi positioning system (WPS), or other device location determination means. These embodiments, and others, enable the provision and/or presentation of a remote control user interface that is most relevant (e.g., most useful, efficient, well-organized, pertinent) for the remote control of a particular object, type of object, or controllable element that may exist in multiple objects or types of objects. Notably, embodiments of the present invention may enable "on the fly" access to a relevant remote control for an object, for immediate or future use. In addition, remote control user interfaces of the present invention may be, in some embodiments of the present invention, reconfigurable—possibly either automatically (e.g., by means of a remote control user interface software update, by means of some development at the object), or manually by a user of a mobile device. Examples of reconfiguration may include addition or deletion of a control element (e.g., a button or slider), rearrangement of control elements, and more. Such reconfigurations may occur during an instance of use, or between instances of use. Variations of remote control user interfaces of the present invention, methods and means of their selection, methods and means of their presentation, methods and means of their use, and methods and means of their enablement on a mobile device of the present invention, are within the scope of the present invention.

In general, any wireless communication described herein—including but not limited to the upload of a RCUI from a source to a mobile devices—may be implemented in any of a variety of ways, including, without limitation, by means of current near-field communications technologies and related standards and protocols (e.g., for near-range wireless communications used by certain embodiments of the present invention), as well as current mobile device (e.g., cell phone) communication technologies and related standards and protocols (e.g., for longer-range wireless communication used by certain other embodiments of the present invention). It is understood that wireless communication technologies, standards and protocols are evolving rapidly, and that systems and methods of the present invention may be implemented using any of a wide range of these technologies, standards and protocols.

Similarly, uploading, transferring, transmitting, or otherwise providing a remote control user interface (or any data or information related to such an user interface) described herein may be implemented, for example, by performing such transmission over any network, such as the Internet (or other network that uses the Internet Protocol (IP)), a Local Area Network (LAN), or other similar network. Furthermore, any reference herein to communication over "the Internet" should be understood to refer more generally to any communications performed using the Internet Protocol (IP) or any similar protocol.

As a specific example, the systems of FIGS. 1A-1D may include multiple remote control user interfaces. For example, such multiple remote control user interfaces may be stored at the remote computer 3a, the object 1a, the object-associated NFC element 1c, or elsewhere. At least two of the multiple RCUIs may differ from each other and be associated with different remotely-controllable objects. Within the multiple remote control user interfaces there may, for example, be at least: (1) a first remote control user interface associated with a first remotely-controllable object; and (2) a second remote control user interface associated with a second remotely-controllable object. The first remote control user interface may differ from the second remote control user interface, and the first remotely-controllable object may differ from the second remotely-controllable object. For example, the first remote control user interface may include a user interface element (such as a soft key representing a button) that the second remote control user interface does not include. As examples of ways in which the first remotely-controllable object may differ from the second remotely-controllable object, the first and second remotely-controllable objects may be different instances of the same product (e.g., a first and second television of the same make and model), or instances of different products (e.g., a television and a DVR). For example, in response to detecting that the mobile device is in physical proximity to the first object, the first user interface that is associated with the first object is selected, and presented by the mobile device to the user. Also, for example, in response to detecting that the mobile device is in physical proximity to the second object, the second user interface that is associated with the second object is selected, and presented by the mobile device to the user. A mobile device may store (and make accessible to a user) only the first remote control user interface, only the second remote control user interface, or both of them (e.g., a user may be able to select one of them, or switch between them in order to have ready access to two different RCUIs for control of two different objects). In addition, a mobile device or other element of an embodiment of a system of the present invention may store various RCUIs (such as those that have been previously accessed or used by a user on a particular mobile device) so that the user may readily access any of them on the mobile device in the future. Similarly, portions or elements of RCUIs may be stored in electronic memory by the mobile device or elsewhere for future access and use, such as for the creation of a future remote control user interface.

In one embodiment, based on input received by mobile device 2c remote control user interface 2d relating to an action that a user desires to be performed at object 1a, mobile device 2c communicates information relating to the desired action to remote computer 3a by wireless communications means. Such wireless communications means may, in one embodiment, be any communication means typically used by cellular phones that uses radio waves to exchange information with one or more base stations (e.g., cell sites) of a network of base stations, the network which is further connected (e.g., by wires, or wirelessly) to remote computer 3a. Variations in communication between mobile device 2c (or possibly other elements of the present invention having wireless transmission means) and remote computer 3a of the present invention are within the scope of the present invention. In such an embodiment of the present invention, remote computer 3a is remote and physically separate from object 1a, meaning that remote computer 3a and object 1a may be located thousands of miles away from each other, for example. In other embodiments of the present invention, remote computer 3a and object 1a may be in close proximity. In general, however, mobile device and remote computer are physically distinct.

In one embodiment, remote computer 3a is a computer, server or other electronic information processing technology, possibly including or being associated with a database, that is i) capable of receiving information from mobile device 2c, ii) possibly manipulating, converting or interpreting the received information, and then iii) further communicating the same or new information to object controller 4a to ultimately facilitate some action to be performed at object 1a, for example. In another embodiment of the present invention, remote computer 3a is "in the cloud," meaning that remote computer 3a is an information processing system (e.g., computer) that is physically remote and distinct from object 1a, and may be distributed in nature. As a result, remote computer 3a may communicate with object 1a over the Internet or other network. Other embodiments of remote computer 3a are within the scope of the present invention.

Information may be communicated between remote computer 3a and object controller 4a using any one or more of a variety of means, including, but not limited to, wires, fiber optic cable, or wirelessly. In one embodiment, for example, remote computer 3a communicates with object controller 4a (the interaction represented in FIG. 1A as 3b) using the Internet (which may include wired and/or wireless modes of information transfer, for example), for example. Also, any of a variety of communications protocols may be used in such an information transfer or exchange 3b. Whether the communication between remote computer 3a and object controller 4a is one-way or two-way, the information being transferred from remote computer 3a to object controller 4a is sufficient to enable object controller to facilitate the control of object 1a in a manner desired by a user, according to the input received at the relevant remote control user interface 2d. Such communication between remote computer 3a and object controller 4a may take place by means of a network, such as the Internet. An embodiment may use multiple such communications means, possibly simultaneously. Variations in communication means between remote computer 3a and object controller 4a are within the scope of the present invention.

Object controller 4a receives information from remote computer 3a, such information relating to the desired action to be performed at or upon object 1a. Object controller 4a may, in one embodiment, be any means that translates the information received from remote computer 3a into the action to be implemented at object 1a, for example. In one embodiment, object controller 4a may be built into object 1a and may control some controllable aspect of object 1a, such as a movement or sound volume, for example. In yet another embodiment, object controller 4a may be external to object 1a, such as a robot or piece of manufacturing equipment that performs some action to control object 1a. In yet another embodiment, object controller 4a may be attachable or connectable to object 1a. Object controller 4a may, in one embodiment, include a combination of electronic means to receive and process information, and electromechanical means to cause the performance of a physical movement or action at object 1a, e.g., opening a door (the door which would, in this example, be object 1a), causing a toy to move forward (the toy which would, in this example, be object 1a), resetting a medical device (the medical device which would, in this example, be object 1a). In another embodiment, object controller 4a may be an electronic processor capable of controlling electronic signals that may facilitate performance of a desired action, e.g., changing volume of a television (the television which would, in this first example, be object 1a), changing a presentation on a display (the display which would, in this example, be object 1a). In yet another embodiment, object controller 4a may be an electronic processor that causes execution of code or software in another electronic processor or device. In various embodiments, object controller 4a may be or include, either alone or in combination, without limitation, any of the following: actuator, servo, motor, computer, signal processor, electronic storage device, responsive material, magnetic device, biomechanical means, light, display, heating element, or speaker. In yet other embodiments, object controller 4a may be or include means that are adjustable or changeable, and that perform any of a wide range of permissible actions at object 1a. Variations in the way object controller 4a controls an object 1a of the present invention are within the scope of the present invention.

FIG. 1B shows examples of other possible interactions between various elements an embodiment of the present invention similar to the embodiment shown in FIG. 1A, including interactions 1d', 2b', 2e', 3b' and 4b'. Each of these interactions may, for example, relate to a communication protocol (e.g., a signal to initiate or facilitate a communication, acknowledge receipt of information, increase data integrity), or provision of feedback to the recipient element of the present invention. For example, interaction 4b' may provide information from object 1a to object controller 4a indicating that a specific desired action has been performed by object 1a. Alternatively, interaction 4b' may include the provision of information relating to object 1a that gets communicated back to remote control user interface 2d (by means of remote computer 3a) to provide information at remote control user interface 2d that would help a user of the remote control user interface 2d control object 1a. In general, an embodiment of an individual interaction 1d', 2b', 2e', 3b', 4b' may be a communication (e.g., exchange of data, bits, information) between relevant elements of the present invention that i) transfers information relating to a desired action to be performed at object 1a, ii) confirms instructions or actions relative to performance of a desired action at object 1a (e.g., feedback), or iii) provides information to remote control user interface 2d that helps a user understand, monitor or control object 1a. Other interactions and communications between elements of the present invention are within the scope of the present invention.

FIG. 1C shows a representation of an embodiment of a system of the present invention that represents tagging of a first object 1a (that is similar to a second object, of the same type as a second object 1z, or having one or more similar controllable features as second object 1z), which—by means of the systems and methods described herein—enables the remote control of second object 1z. For example, tagging a first image projector with a NFC-equipped mobile device would allow a user to use the mobile device 2c and remote control user interface 2d to communicate with a remote computer 3a and object controller 4a that controls a second image projector, in order to control the second image projector. In such a use case, where there are two or more similar objects (meaning, for example, objects that have the same controllable features and may be controlled by the same relevant remote control user interface), the remote control user interface that is enabled may, for example, offer a user the ability to select which specific object (possibly from a group of objects) the user desires to control. For example, tagging a first object that is a remotely controllable toy may enable a relevant remote control user interface that allows a user to select if the user wants to control the first object, or any one (or more) other similar remotely controllable toys. Such ability to select which object to control, from among multiple similar objects, may involve user authentication and/or authorization protocols (as described herein) so that any particular mobile device 2c or user is provided the ability to control only certain objects. Variations in the methods and means for tagging a first object to then be able to control a second object that is similar (or has similar control elements) to the first object, are within the scope of the present invention.

Figure 1D:
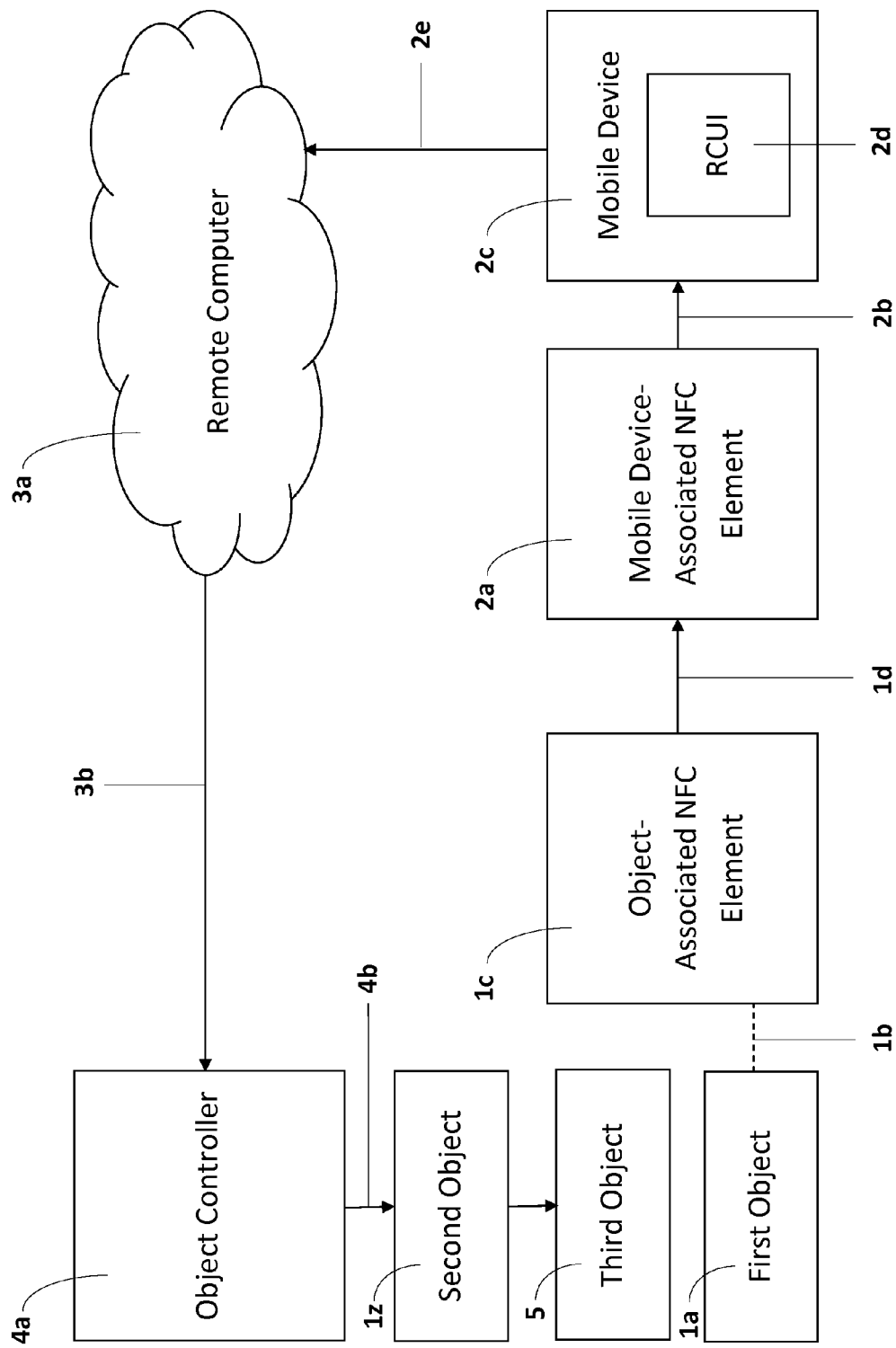
FIG. 1D shows a representation of a fourth embodiment of a system of the present invention.

FIG. 1D shows yet another embodiment of the present invention. In this embodiment, first object 1a is tagged, leading to enablement of a remote control user interface 2d that facilitates the control of manufacturing equipment (second object 1z, which is not similar to object 1a), which causes the manufacture of a third object 5 which is similar in at least some ways to object 1a. An example of this would be a user using a mobile device to tag an item of clothing that the user admires and wishes to order in a different color, size, etc. Upon tagging the item of clothing, the user would be presented with a remote control user interface that allows the user to select, for example, a garment size, color, fabrics, and possibly other customizable characteristics of the garment. The remote control user interface would then lead to the control (by providing the user's desired garment characteristics) to machinery capable of creating the garment, for example. Such machinery would then, in whole or in part, manufacture the garment according to the desired characteristics as input to the remote control user interface by the user. The result would be a third object 5 that is similar, in at least some ways, to tagged object 1a. When an object may be considered as part of a set of related objects, such an embodiment may be viewed as tagging one element of the set and then controlling another related element of the set.

FIGS. 2A-2C each show a representation of an embodiment of remote control user interfaces of the present invention. FIG. 2A shows an embodiment of a remote control user interface 10a shown on an interactive (e.g., touch screen) display of a mobile device 2c that could be used to enable control of a residential lighting system. As a further example, FIG. 2B shows an embodiment of a remote control user interface 11a shown on an interactive (e.g., touch screen) display of a mobile device 2c that could be used to control a television, including turning the television on and off, and also enabling channel and volume selection. As yet another example, FIG. 2C shows an embodiment of a remote control user interface 12a shown on an interactive (e.g., touch screen) display of a mobile device 2c that could be used to remotely control a remote control aircraft, enabling a user to cause the aircraft to go left or right, up or down, faster or slower. These representations show only a small range of features and presentations of remote control user interfaces that may be implemented according to the present invention. Notably, remote control user interfaces of the present invention may be presented in other ways (e.g., using sounds or voices), may be interacted with in other ways (e.g., mobile device movement, voice commands), may use any of a wide range of control elements and control element presentations (some of which may possibly be modified by a user), and may provide additional information or feedback to a user. Many variations in the remote control user interface of the present invention are within the scope of the present invention.

Figure 3A:
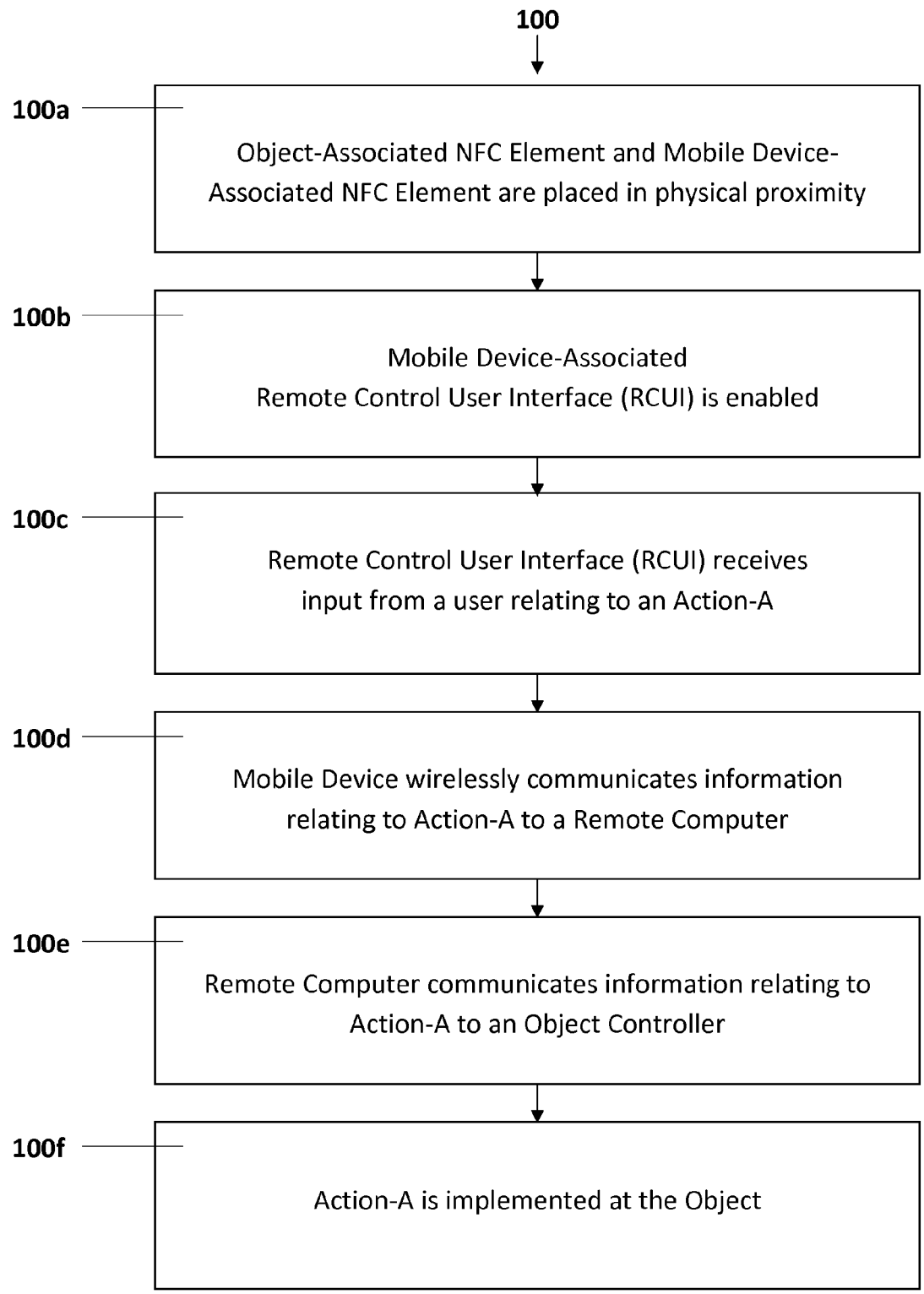
FIG. 3A shows a representation of a first embodiment of a method of the present invention.

FIG. 3A shows a representation of an embodiment of a method of the present invention 100. In a first step 100a, object-associated NFC element and mobile device-associated NFC element are placed in physical proximity (e.g., a distance of less than twenty centimeters from one another). Next, as shown in step 100b, mobile device remote control user interface (RCUI) is enabled, meaning that a user interface is presented to a user. In step 100c, the remote control user interface receives an input from a user that relates to a desired action (Action-A).

Next, in step 100d, the mobile device communicates information relating to Action-A to a remote computer. In step 100e, the remote computer further communicates information to an object controller. In step 100f, Action-A is implemented at the object. Variations of the method 100 shown in FIG. 3A are within the scope of the present invention, including the addition or deletion of steps in the process, additional communications between various elements of the present invention, possibly enabling visual or tactile feedback to be provided to the user by means of the remote control user interface or other means; updating of information presented on a remote control user interface, possibly including real-time updates relating to an object; and more.

Figure 3B:
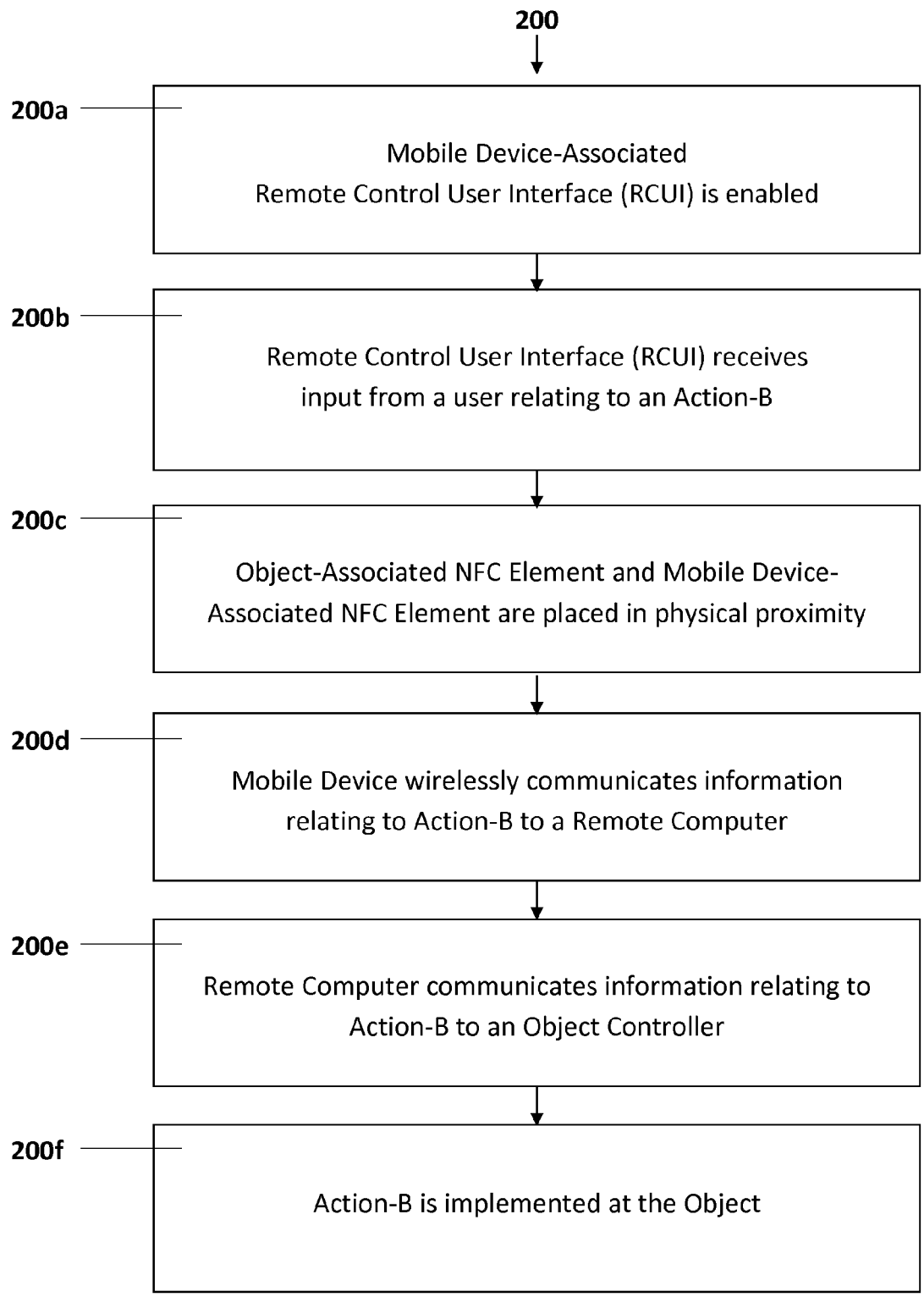
FIG. 3B shows a representation of a second embodiment of a method of the present invention.

Embodiments of the present invention may also present a remote control user interface to a user prior to the tagging (e.g., identification) of a specific object to be controlled. FIG. 3B shows a representation of such an embodiment of a method of the present invention 200. Method 200 relates to providing remote control user interface prior to tagging an object that is desired to be remotely controlled, involving the steps of: first enabling remote control user interface at a mobile device 200a, then having the remote control user interface receive input from a user relating to an Action-B 200b, next placing mobile device-associated NFC element and object-associated NFC element in physical proximity (e.g., tagging the object with the mobile device) 200c, next mobile device wirelessly communicates information relating to Action-B to a remote computer 200d, the remote computer then communicates information relating to Action-B to an object controller 200e, and in a last step of method 200 the Action-B is implemented at the object 200f. Other preceding, intervening or following steps are within the scope of the present invention (e.g., feedback from the object to the RCUI, or other communications between elements of the system of such an embodiment of the present invention). For example, a first object may be tagged, and then a second object (that is similar to the first object, of the same type as the first object, or having at least one common controllable feature as the first object) may be remotely controlled. As may be seen by this example, embodiments of the present invention may include variations in how they are used, the sequence of steps or events during use, and how this provides for the control of objects.

Figure 3C:
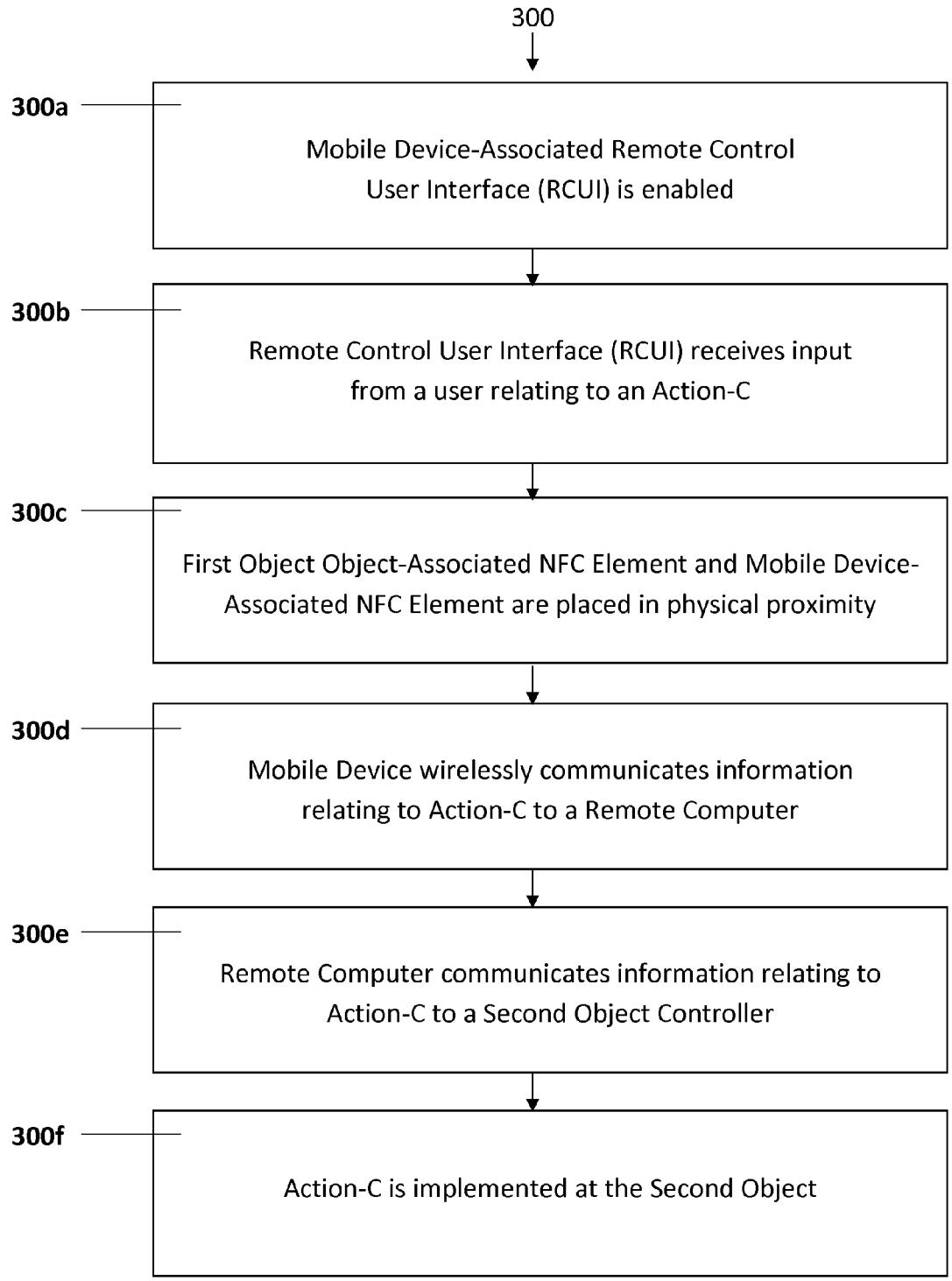
FIG. 3C shows a representation of a third embodiment of a method of the present invention.

FIG. 3C shows such a method 300, which may be essentially method 200 with some variation, such that a first object is tagged and a second object is controlled. For example, mobile device could show a RCUI and allow a user to provide one or more inputs using the RCUI, and then the mobile device could be used to tag an object in order to control that object in some way, including for example, providing user-specific settings to the object, by means of communication with a remote computer, as described. A similar (but not the same object that is to be controlled) may have been tagged initially, which may have facilitated the upload, download or other provisioning of a relevant RCUI to the mobile device. In one example of a use of such an embodiment of a method and systems of the present invention, a user would use a RCUI that allows the user to enter settings for a piece of exercise equipment, such as a treadmill. Settings could relate to the duration and/or difficulty of an exercise session, for example. Alternatively, a user might be able to simply select from one of a variety of exercise routines. These settings would be stored in memory and upon approximation of the NFC-equipped mobile device and a NFC-equipped object (which may be the same or a similar object to one previously tagged, such as the same treadmill as was initially tagged, or a treadmill right next to it or of a similar type at another location), the object would receive the user's selected settings and implement them. Another example relating to embodiments that may apply a method 300 of the present invention relates to tagging a building or associated structure, such as an first object at a front desk of a hotel, and then being able to control various second objects, possibly depending on the location of the mobile device (e.g., a lighting remote control would enable control of lights only in a guest room in which the mobile device is then located). Variations in methods 200 and 300 are within the scope of the present invention. Control of a second object (based on initially tagging a separate but related object) has many benefits, and may be further modified based on the location of a user, user identification or authentication, and more.

An embodiment of a method of the present invention may provide for user or device authentication as part of a process. For example, user or mobile device identity might be verified by any of a variety of means prior to enablement (e.g., presentation) of a remote control user interface, or prior to a user's ability to use a remote control user interface, or prior to the acceptance or carrying out of certain user commands by means of a particular remote control user interface. For example, controlling a piece of dangerous machinery might require authentication of the device user prior to enabling control; placing an order that would charge a credit card might seek authentication of the user (or possibly the device, or both) prior to enabling control of the order process; or control of any personal or privately-owned object might require authentication of a mobile device or user, meaning a device or user that has been predetermined to be allowed to control the object. Such authentication could be accomplished in any of a variety of ways, or combinations of ways, using any of a range of means, including but not limited to: username and/or password input, device identification, device location, time of day, timeframe (e.g., if input is received within a certain amount of time from an initial use or other event), biometric data input to a device, user behavior (e.g., speed, movement, past purchases), user metrics (e.g., sensed inputs, trends), and more. Authentication may be automatic or require a user's cooperation.

Beyond authentication of a particular user or device to enable control of an object, embodiments of the present invention may also provide for control of authority, meaning how one or more of multiple possible controlling mobile devices are authorized to control an object (separate from, but possibly in combination with, whether or not such mobile devices or their users are required to be authenticated by any particular implementation of systems and methods of the present invention as described above). For example, in one embodiment, control authority over a particular object is granted only to the most recent mobile device to have tagged the object-associated NFC element. In yet another embodiment relating to control authority, only a mobile device within a certain geographic area or proximity to an object is granted the authority to control the object (and in such an embodiment, the granting of a control privilege might be further limited to when the mobile device remains within the certain geographic area or proximity to the object). In yet another embodiment, control authority might be granted to a device or user only during a particular time range (e.g., work shift), or for a particular duration after first use of a particular RCUI to control a particular object, for example. In other embodiments of the present invention, control authority might only be granted to a device or user to control a given object based on whether a mobile device is the first device to tag an object-associated NFC element or, alternatively, if a mobile device is the last device to tag the object's object-associated NFC element, for example (and in the case where the mobile device is the first device to tag an object in order to be able to control it, control authority might further be limited to a certain amount of time, or maintaining proximity to the object, for example). In yet another embodiment, control authority may be granted to a most senior user, e.g., a user with highest experience, rank, or other tiered rating or credential. A practical example of control authority might relate to a media or entertainment system, such as one commonly found in a home, or one commonly found in front of a seated passenger on a commercial airplane. In such an example, a first user could tag an object-associated NFC element with a first device to be able to control the object using the first device. Later, a second user could tag the same object-associated NFC element with a second device to control the same object with the second device, and the first device's control authority would be voided (e.g., the first device would no longer be able to control the object). In another scenario, the first device's control authority lasts for the period of time when the device is in proximity to the object, or for a limited period of time (e.g., an hour, duration of a flight, an amount of time that a user has paid for, such payment mechanism which may be incorporated into a method of the present invention) following initial tagging of the object, for example. It should also be noted, relating to authentication and control authorization, that there may be instances where more than one mobile device could be controlling an object, or aspects of an object, at the same time. This could happen relating to control any of a variety of objects, including but not limited to machinery, manufacturing equipment, computers, transportation means, entertainment and gaming systems, etc. For example, different mobile devices and their users might simultaneously control (e.g., in cooperation, as a crowd-sourced) an object, or different mobile devices and their users might control different controllable aspects of an object, at the same time (and may also, for example, be able to trade off control). Many variations of embodiments of authentication and control authority are within the scope of the present invention.

Embodiments of the present invention may be used in any of a variety of ways, and for many different purposes. Sample applications include remote control of (among other things): consumer electronic devices, entertainment systems (both residential and commercial, such as those found on aircraft), commercial electronic devices, office equipment, manufacturing processes, transportation means, wheeled craft, sea craft, aircraft, medical devices, medical instrumentation, explosives or other dangerous materials or processes, doors, access portals, tubes, pipes, materials, living organisms, and more. To the extent that an object controller can control any aspect of a thing or process, the thing or process may represent an embodiment of an object of the present invention.

Features of embodiments of the present invention may include, without limitation, the identification of an object (or environment) to be controlled by means of approximating a mobile device with the object or a tag associated with the object; upload to the mobile device of a remote control user interface (or instructions or other information that leads to the creation of such a remote control user interface) that is specific to the object and/or the user (e.g., at least partly based on a user's behaviors or preferences); presentation of a remote control user interface by the mobile device that enables control of an object; and facilitation of control of the object (per the inputs provided by a user at the mobile device) by means of wireless communication between the mobile device and a network such as the Internet or similar network. In addition, embodiments of the present invention may enable the mobile device to provide feedback to a user, such feedback based on sensing at, or information about, the object. The inclusion of authentication by some embodiments of the present invention enable access control and customization, such as by permitting some users (but not others) to be able to have a RCUI uploaded to a mobile device in the first place, to have a RCUI functioning on the mobile device, to have certain RCUI control elements present (or not), or to have certain RCUI elements enabled (or disabled). In addition, the present invention may enable one or more remote control user interfaces on a given mobile device, either to be presented and used one at a time, or simultaneously. Embodiments of systems and mobile devices of the present invention may facilitate presentation and use of a RCUI "on the fly" (e.g., single use), or may store a library of user interfaces that are accessible to a particular user or device. A RCUI may, according to embodiments of the present invention, be user manipulated (e.g., a user may be able to reconfigure a presentation of RCUI control elements, including moving them around or deleting any that are unnecessary or not used) or otherwise customized by or for a particular user or device, or even according to circumstances such as the location, behavior or other sensed attributes relating to a user. Many variations to these and other features of the present invention are possible.

In general, embodiments of the present invention offer many benefits. As one example, embodiments of the present invention enable a user to access relevant remote control user interfaces (meaning, for example, a remote control user interfaces that are specific to control of particular target objects), on a mobile device, for one or more objects that the user desires to control—all by means of a NFC initiated physical approximation of the user's mobile device and an object-associated NFC element (as noted, other types of interactions are also within the scope of the present invention). As another example of benefits of the present invention, embodiments of the present invention enable mobile device users to remotely control objects by means of wireless communication with a remote server, rather than directly (meaning direct communication between a device and an object, such as would be the case with a current television remote control). This has many benefits, including the ability to use information other than that which would be available in a direct interaction between a mobile device and an object. Embodiments of the present invention allow a mobile device user to possess and use different remote control user interfaces for each of many different objects, providing remote control user interfaces that are most relevant to each target object. Embodiments of the present invention also benefit users by enabling revisions and updates to remote control user interfaces for particular objects, possibly either automatically or manually based on a user's behaviors or preferences. Another benefit of the present invention relates to user authentication, which may be provided in any of a variety of ways that are not possible using conventional remote controls. Another benefit of the present invention relates to control authority and the ability to provide various approaches (including combinations of approaches) to enable different users control that same object in any of a variety of ways. Ultimately, embodiments of the present invention benefit users by enabling them to use a personal mobile device (rather than one or more other devices) to control one or more remotely controllable objects using remote control user interfaces that are specific and relevant to each object. In addition, features of embodiments of the present invention including but not limited to modification of a remote control user interface according a user's preferences or behaviors, and also the application of any of a variety of authentication and control authority schemes, provide other useful benefits. Many other benefits are attributable to embodiments of the present invention.

It is to be understood that although the invention has been described above in terms of particular embodiments, the foregoing embodiments are provided as illustrative only, and do not limit or define the scope of the invention. For example, while NFC is used to describe embodiments throughout this disclosure, other types and forms of proximity-based identification means are within the scope of the present invention, such as those involving the presentation and reading of bar codes. Various other embodiments, including but not limited to the following, are also within the scope of the claims. For example, elements and components described herein may be further divided into additional components or joined together to form fewer components for performing the same functions. The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices. Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, interactive display, or other output medium.

What is claimed is:

1. A computer-implemented method comprising:
   (A) determining a first location of a mobile device;
   (B) in response to the determination of the first location of the mobile device, providing a first remote control user interface at the mobile device based on the first location of the mobile device;
   (C) receiving first input from a user via the first remote control user interface, the first input relating to a first action to be performed at a first object located in proximity to the first location while the mobile device is in proximity to the first location;
   (D) wirelessly transmitting, from the mobile device to a remote server, a first communication relating to the first action; and
   (E) wirelessly receiving, at the mobile device from the remote server, first feedback relating to the first action.

2. The method of claim 1, further comprising:
   (F) transmitting, from the remote server to a first controller associated with the first object, a third communication based on the first communication relating to the first action.

3. The method of claim 2, wherein (E) further comprises, before wirelessly receiving the first feedback relating to the first action, receiving, at the remote server, second feedback from the first controller, wherein the first feedback is derived from the second feedback.

4. The method of claim 3, further comprising:
   (F) before (E), at the remote server, transmitting information relating to the first feedback to the mobile device.

5. The method of claim 1, further comprising:
   (F) transmitting the first remote control user interface to the mobile device.

6. The method of claim 1, wherein (B) comprises displaying elements of the first remote control user interface on a display of the mobile device.

7. The method of claim 5, further comprising:
   (G) storing the first remote control user interface on the mobile device.

8. The method of claim 1, wherein (B) comprises:
   (B)(1) determining that the user is authorized to use the first remote control user interface; and
   (B)(2) providing access to the first remote control user interface to the user in response to the determination that the user is authorized to use the first remote control user interface.

9. The method of claim 1, wherein (B) comprises:
   (B)(1) determining that the mobile device is authorized to facilitate control of the first object; and
   wherein providing the first remote control user interface at the mobile device comprises providing the first remote control user interface to the mobile device in response to determining that the mobile device is authorized to facilitate control of the first object.

10. The method of claim 1, further comprising:
   (F) receiving second input from the user, the second input relating to a second action to be performed by the object while the mobile device is in proximity to the first location;
   (G) wirelessly transmitting a second communication relating to the second action; and
   (H) receiving second feedback.

11. The method of claim 10, further comprising:
(I) generating a second communication relating to the second action based on the second user input; and
(J) transmitting the second communication to the remote computer.

12. The method of claim 1, further comprising:
(F) revising a presentation of the first remote control user interface on the mobile device based on the first feedback.

13. The method of claim 1, wherein (B) comprises selecting the first remote control user interface from among a plurality of remote control user interfaces.

14. The method of claim 1, wherein determining the first location of the mobile device comprises determining the first location of the mobile device using a global positioning system (GPS).

15. The method of claim 1, wherein determining the first location of the mobile device comprises determining the first location of the mobile device using a Wifi positioning system (WPS).

16. The method of claim 1, wherein (E) comprises receiving first feedback indicating that the first action has been performed.

17. A non-transitory computer-readable medium comprising computer program instructions executable by at least one computer processor to cause a first mobile device to perform a method, the method comprising:
(A) determining a first location of a mobile device;
(B) in response to the determination of the first location of the mobile device, providing a first remote control user interface at the mobile device based on the first location of the mobile device;
(C) receiving first input from a user via the first remote control user interface, the first input relating to a first action to be performed at a first object located in proximity to the first location while the mobile device is in proximity to the first location;
(D) wirelessly transmitting, from the mobile device to a remote server, a first communication relating to the first action; and
(E) wirelessly receiving, at the mobile device from the remote server, first feedback relating to the first action.

18. The non-transitory computer-readable medium of claim 17, wherein the method further comprises:
(F) transmitting, from the remote server to a first controller associated with the first object, a third communication based on the first communication relating to the first action.

19. The non-transitory computer-readable medium of claim 18, wherein (E) further comprises, before wirelessly receiving the first feedback relating to the first action, receiving, at the remote server, second feedback from the first controller, wherein the first feedback is derived from the second feedback.

20. The non-transitory computer-readable medium of claim 19, wherein the method further comprises:
(F) before (E), at the remote server, transmitting information relating to the first feedback to the mobile device.

21. The non-transitory computer-readable medium of claim 17, wherein the method further comprises:
(F) transmitting the first remote control user interface to the mobile device.

22. The non-transitory computer-readable medium of claim 21, wherein (B) comprises displaying elements of the first remote control user interface on a display of the mobile device.

23. The non-transitory computer-readable medium of claim 21, wherein the method further comprises:
(G) storing the first remote control user interface on the mobile device.

24. The non-transitory computer-readable medium of claim 21, wherein (B) comprises:
(B)(1) determining that the user is authorized to use the first remote control user interface; and
(B)(2) providing access to the first remote control user interface to the user in response to the determination that the user is authorized to use the first remote control user interface.

25. The non-transitory computer-readable medium of claim 21, wherein (B) comprises:
(B)(1) determining that the mobile device is authorized to facilitate control of the first object; and
wherein providing the first remote control user interface at the mobile device comprises providing the first remote control user interface to the mobile device in response to determining that the mobile device is authorized to facilitate control of the first object.

26. The non-transitory computer-readable medium of claim 17, wherein the method further comprises:
(F) receiving second input from the user, the second input relating to a second action to be performed by the object while the mobile device is in proximity to the first location;
(G) wirelessly transmitting a second communication relating to the second action; and
(H) receiving second feedback.

27. The non-transitory computer-readable medium of claim 26, wherein the method further comprises:
(I) generating a second communication relating to the second action based on the second user input; and
(J) transmitting the second communication to the remote computer.

28. The non-transitory computer-readable medium of claim 17, wherein the method further comprises:
(F) revising a presentation of the first remote control user interface on the mobile device based on the first feedback.

29. The non-transitory computer-readable medium of claim 17, wherein (B) comprises selecting the first remote control user interface from among a plurality of remote control user interfaces.

30. The non-transitory computer-readable medium of claim 17, wherein determining the first location of the mobile device comprises determining the first location of the mobile device using a global positioning system (GPS).

31. The non-transitory computer-readable medium of claim 17, wherein determining the first location of the mobile device comprises determining the first location of the mobile device using a Wifi positioning system (WPS).

32. The non-transitory computer-readable medium of claim 17, wherein (E) comprises receiving first feedback indicating that the first action has been performed.

33. The method of claim 1, further comprising:
(F) receiving second input from the user via the first remote control user interface, the second input relating to a second action to be performed at the first object location in proximity to a second location while the mobile device is in proximity to the second location;
(G) wirelessly transmitting, from the mobile device to the remote server, a second communication relating to the second action; and (H) wirelessly receiving, at the mobile device from the remote server, second feedback relating to the second action.

34. The method of claim 1, further comprising:
(F) at the mobile device, displaying information based on the first feedback to the user.

35. The non-transitory computer-readable medium of claim 17, wherein the method further comprises:
(F) receiving second input from the user via the first remote control user interface, the second input relating to a second action to be performed at the first object location in proximity to a second location while the mobile device is in proximity to the second location;
(G) wirelessly transmitting, from the mobile device to the remote server, a second communication relating to the second action; and
(H) wirelessly receiving, at the mobile device from the remote server, second feedback relating to the second action.

36. The non-transitory computer-readable medium of claim 17, wherein the method further comprises:
(F) at the mobile device, displaying information based on the first feedback to the user.

* * * * *